US010169206B2

(12) United States Patent
Magre et al.

(10) Patent No.: US 10,169,206 B2
(45) Date of Patent: Jan. 1, 2019

(54) SIMULTANEOUS MULTI-PLATFORM TESTING

(71) Applicant: ACCENTURE GLOBAL SOLUTIONS LIMITED, Dublin (IE)

(72) Inventors: Prasad G. Magre, Burhanpur (IN); Adnan Khan, Gurgaon (IN); Tarandeep Singh Chandhok, New Delhi (IN); Shefali Agarwal, Gurgaon (IN); Jitender Saini, Gurgaon (IN); Manoj Mondal, Noida (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 93 days.

(21) Appl. No.: 15/392,625

(22) Filed: Dec. 28, 2016

(65) Prior Publication Data
US 2018/0137035 A1    May 17, 2018

(30) Foreign Application Priority Data

Nov. 15, 2016    (IN) .............................. 201641038994

(51) Int. Cl.
G06F 11/36    (2006.01)

(52) U.S. Cl.
CPC ...... *G06F 11/3664* (2013.01); *G06F 11/3692* (2013.01)

(58) Field of Classification Search
CPC .............. G06F 3/0482; G06F 11/3664; G06F 11/3692; G06F 17/272
USPC .................................................. 717/124–135
See application file for complete search history.

(56) References Cited

U.S. PATENT DOCUMENTS

| | | | | | |
|---|---|---|---|---|---|
| 6,662,217 | B1 * | 12/2003 | Godfrey | ................. | H04L 43/50 709/203 |
| 7,124,401 | B2 * | 10/2006 | Muller | ................ | G06F 11/3664 717/124 |
| 7,277,827 | B2 * | 10/2007 | Shapiro | ................ | G06F 11/263 702/119 |
| 7,676,794 | B2 * | 3/2010 | Akiyama | ................ | G06F 8/30 714/38.14 |
| 7,752,607 | B2 * | 7/2010 | Larab | .................... | G06Q 10/10 717/135 |
| 8,739,126 | B2 * | 5/2014 | Glaser | ................ | G06F 11/3672 709/219 |
| 8,856,748 | B1 | 10/2014 | Larsen et al. | | |
| 9,032,373 | B1 * | 5/2015 | Gupta | ................. | G06F 11/3688 717/127 |
| 9,262,176 | B2 * | 2/2016 | Fillipi | ...................... | G06F 9/44 |
| 9,430,364 | B1 * | 8/2016 | Ryan | ................. | G06F 11/3664 |
| 9,501,657 | B2 * | 11/2016 | Wu | .................... | G06F 11/3684 |
| 9,710,367 | B1 * | 7/2017 | Nagineni | ........... | G06F 11/3684 |
| 9,747,191 | B1 * | 8/2017 | Marolia | ............. | G06F 11/3664 |
| 9,788,219 | B1 * | 10/2017 | Michel | .................. | H04W 24/06 |
| 2003/0046016 | A1 * | 3/2003 | Grey | ................... | G06F 11/2273 702/119 |
| 2005/0229162 | A1 * | 10/2005 | Tanner, Jr. | .......... | G06F 11/3696 717/126 |

(Continued)

*Primary Examiner* — Andrew M. Lyons
(74) *Attorney, Agent, or Firm* — Manova & Kang, P.C.

(57) ABSTRACT

According to an example of the present disclosure, a software testing system is operable to test functionalities of a web application across different platforms. The software testing system can interact with different platforms via different drivers to facilitate multiplatform testing of the functionalities. Also, multiplatform test result views may be generated.

18 Claims, 11 Drawing Sheets

(56) References Cited

U.S. PATENT DOCUMENTS

| | | | | |
|---|---|---|---|---|
| 2006/0259910 A1* | 11/2006 | Popp | | G06F 17/3089 719/315 |
| 2007/0169015 A1* | 7/2007 | Seelig | | G06F 8/20 717/136 |
| 2009/0007074 A1* | 1/2009 | Campion | | G06F 9/5072 717/124 |
| 2009/0019315 A1* | 1/2009 | Belvin | | G06F 11/3688 714/38.14 |
| 2009/0094327 A1* | 4/2009 | Shuster | | G06F 17/2235 709/203 |
| 2009/0300423 A1* | 12/2009 | Ferris | | G06F 11/36 714/38.1 |
| 2010/0306590 A1* | 12/2010 | Anand | | G06F 11/3664 714/32 |
| 2011/0289489 A1* | 11/2011 | Kumar | | G06F 11/3664 717/135 |
| 2011/0302267 A1* | 12/2011 | Christensen | | G06F 8/31 709/217 |
| 2012/0030514 A1* | 2/2012 | Lawrance | | G06F 11/3672 714/38.1 |
| 2012/0042210 A1* | 2/2012 | Glaser | | G06F 11/3684 714/38.1 |
| 2012/0124462 A1* | 5/2012 | Bannoura | | G06F 9/45516 715/234 |
| 2013/0104105 A1 | 4/2013 | Brown et al. | | |
| 2013/0297973 A1* | 11/2013 | Hyland | | G06F 11/28 714/27 |
| 2014/0201712 A1* | 7/2014 | Boden | | G06F 11/3684 717/124 |
| 2014/0380278 A1* | 12/2014 | Dayan | | G06F 11/3692 717/124 |
| 2014/0380281 A1 | 12/2014 | McLaughlin | | |
| 2015/0039941 A1 | 2/2015 | Kalyanasundram | | |
| 2015/0082282 A1* | 3/2015 | Larsen | | G06F 11/3668 717/125 |
| 2015/0100684 A1* | 4/2015 | Maes | | G06F 11/3672 709/224 |
| 2015/0227498 A1 | 8/2015 | Sarangapani et al. | | |
| 2015/0278076 A1 | 10/2015 | Bs et al. | | |
| 2016/0004628 A1* | 1/2016 | Gugri | | G06F 11/3688 717/124 |
| 2016/0026557 A1* | 1/2016 | Hwang | | G06F 11/3688 717/124 |
| 2016/0044520 A1* | 2/2016 | Iyer | | H04W 24/08 370/252 |
| 2016/0147641 A1 | 5/2016 | Malla | | |
| 2016/0314302 A1* | 10/2016 | Sabetta | | G06F 21/577 |
| 2018/0060221 A1* | 3/2018 | Yim | | G06F 11/3684 |

* cited by examiner

SIMULTANEOUS MULTI-PLATFORM TESTING

PRIORITY

The present application claims priority to Indian patent application number 201641038994, having a filing date of Nov. 15, 2016, the disclosure of which is hereby incorporated by reference in its entirety.

BACKGROUND

Software testing is becoming increasingly important. Owners, operators, and users of computer software expect high standards of reliability. To satisfy these expectations, software is often tested during different phases of development and after completion. There are many well-known approaches and available software tools for performing software testing. During various phases of testing, a series of test cases may be generated by a tester or developer, and executed using a particular software testing tool to test various functionalities of the of software under test. For example, different test cases may be generated and executed to test the different functions of the software.

BRIEF DESCRIPTION OF DRAWINGS

Features of the present disclosure are illustrated by way of examples shown in the following figures. In the following figures, like numerals indicate like elements, in which:

FIGS. 3-7 illustrate examples of screenshots that may be generated by the software testing system, according to examples of the present disclosure;

DETAILED DESCRIPTION

Figure 1:
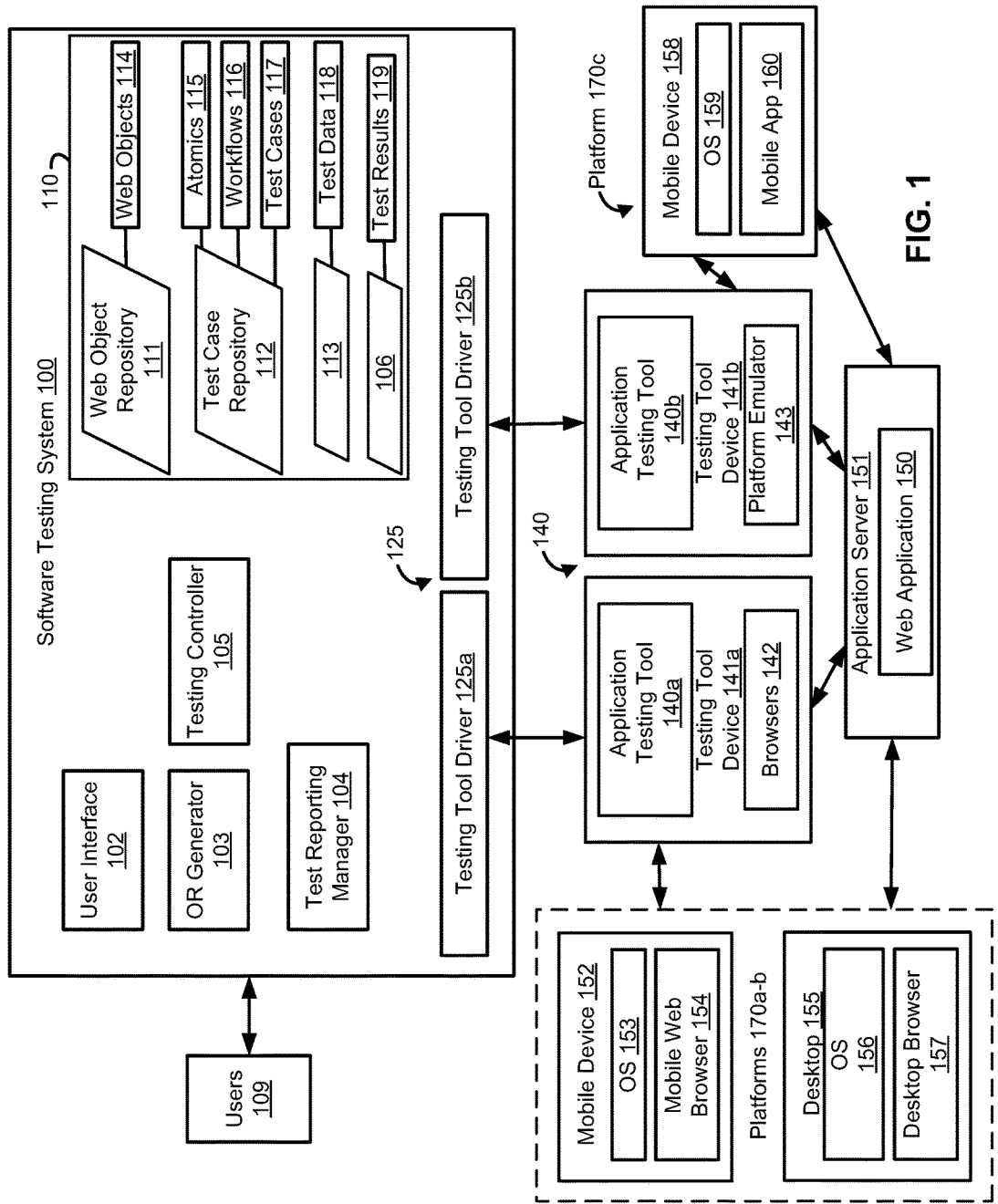
FIG. 1 illustrates components of a software testing system, according to an example of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

According to an example of the present disclosure, a software testing system can execute test cases for an application on multiple platforms simultaneously or in sequence. The software testing system may interact with multiple application testing tools to test the application on the multiple platforms.

The software testing system can test different types of applications. An application is a computer program designed to perform a group of functions, tasks, or activities. For example, an application may perform a series of coordinated activities on behalf of, or for the benefit of, a user. The software testing system, for example, can test web applications. A web application may include an application that runs in a web browser. For example, the web application may be hosted on a remote computer and a user may access and interact with the web application through a web browser running on an end user device. A web application may include applications configured to run on one or more devices, such as a desktop web application that runs in a desktop web browser, a mobile web application that runs in a mobile web browser, etc. For example, a mobile web application may be executed on a smartphone, tablet, or another mobile device. Web applications may be designed to run on different types of browsers. A web application may have a mobile application which may be downloaded and installed on a mobile device, rather than being rendered within a browser. A mobile application may pull content and/or data from the Internet, in similar fashion to a website, or it may download the content so that it can be accessed without an Internet connection. Mobile applications may be designed for a specific mobile device operating system (OS), such as Android® or iOS®.

The software testing system is operable to test an application across multiple platforms. A platform includes hardware and/or software to run an application. For example, a platform may include a mobile device and a particular OS, or a mobile device and a particular browser, or a personal computer and a particular browser. Different platforms may be used for executing the same application. For example, it is not uncommon for a user to access an application through a desktop web browser, and then subsequently access the same application through a mobile web browser or as a mobile application. For example, with social media applications, a user may receive an email about a friend posting a picture. The user may click on a link in the email to access the social media application through a web browser as a web application. The user may subsequently access the same social media application through a mobile application to post a comment. Then, the user may access the social media application through a mobile web browser, such as through a tablet. Multiple different application testing tools may be required to test the application across different platforms.

Typically, to test an application across different platforms, a developer may create test cases for each platform. For example, a software developer may create test cases including test scripts written in a test script programming language used by the particular application testing tool that will run the test scripts. When different application testing tools are used to test the application across different platforms, multiple test scripts may be created for each application testing tool. In addition, a software tester, which may be a person different from the software developer, may need to interact with the software developer to create test cases to test different functionalities of the application and to create test data for running the test cases. As a result, the generation and execution of test cases for the different platforms, and the viewing of test results generally involve disjointed and time-consuming processes. The software testing system according to an example of the present disclosure can facilitate testing an application across different platforms through a framework and a user interface as is further discussed below.

Furthermore, it is not uncommon for software developers and testers to create and execute thousands of test scripts daily, especially for new releases of a web application. Also, testing is commonly performed one platform at a time, further increasing the testing time for the daily execution of test scripts based on the number of platforms. The software testing system can automatically run test cases in parallel across multiple platforms. By running test cases in parallel, the software testing system can decrease test case run times. Decreasing testing time can accelerate the release of new application versions that fix bugs or fix potential security vulnerabilities. Also, the software testing system may include an easy-to-use user interface that allows non-technical testers to implement and execute test cases without any underlying knowledge of the testing tool or scripting language used by the one or more testing tools executing the test cases. This may eliminate or minimize the need for software developers and testers to have to collaborate every time test cases need to be generated and executed. Also, the software testing system may generate cross-platform test results so a single view can be generated to show test results across all the platforms.

FIG. 1 illustrates a software testing system 100, according to an example of the present disclosure. The software testing system 100 is referred to as the system 100. The system 100 includes user interface 102, object repository (OR) generator 103, test reporting manager 104, testing controller 105, and data storage 110. As is further discussed below, the testing controller 105 can execute test cases 117 on multiple different platforms 170 through testing tool drivers 125 and application testing tools 140 to test an application. The system may be used to test any type of application for which application testing tools 140 are available to test the application. By way of example, the application to be tested may be a web application 150 which may exist in multiple different forms on the platforms 170 as is further discussed below.

The testing controller 105 may also configure the test cases 117. For example, the test cases 117 include test scripts. The test scripts may include configuration parameters that are used by the testing tool drivers 125 to execute the test scripts on the application testing tools 140 for different platforms of the platforms 170. The testing controller 105 may determine whether a test case includes the configuration parameters for execution on a selected platform. For example, the test script for the test case is parsed to search for configuration parameters for the selected platform. Regular expression matching may be used for the parsing and searching. If the configuration parameters for the selected platform are not in the test case, then the configuration parameters may be added by the testing controller 105. An example of code, including configuration parameters for a selected platform, that may be added may include:

```
config:{
Browser: "chrome"
Chrome_Driver: "c:\...\chromedriver.exe"
},
```

These configuration parameters are for a platform that includes the "chrome" browser and also includes the path of the testing tool driver. Other parameters may also be included, such as browser version, whether the browser is a mobile browser, etc. Predetermined configuration parameters for each platform may be stored and searched for during the parsing, and if not found, may be included in the test script for a test case.

The user interface 102 allows a user of the system 100 to select platforms of the platforms 170 to test the web application 150, select functionalities to be tested, and select other parameters for the testing. For example, one or more platforms for a desktop application version, mobile web application version and mobile application version of the web application 150 may be selected by the user through the user interface 102. Also, functionalities of the web application 150 may be selected via the user interface 102 for testing. For example, the test cases 117 may include steps describing operations to be performed to test functionalities of the web application 150. The functionalities being tested may include operations that can be performed by the web application 150. Functionalities may be simple, such as a login operation performed in response to clicking a login button on a user interface of the web application 150 and entering a valid user ID and password, or may be complex, such as performing complex calculations, data manipulations, data transformations, etc., based on user input or other data. The user interface 102 may include a graphical user interface, and functionalities available for testing may be selected via a drop down menu, text box, etc. Other parameters for the testing may also be selected, such as whether testing on the selected platforms is to be performed simultaneously (e.g., in parallel) or sequentially (e.g., serially). Also, report generation may be selected.

The test reporting manager 104 controls the reporting of test results. The system 100 may receive test results 119 from the application testing tools 140 and store the test results 119 in data storage 110. The test reporting manager 104 may manage the test results 119, including gathering and consolidating test results for each test case. The test reporting manager 104 may generate test reports including the test results 119, and consolidated views of the test results. The consolidated views may include a multiplatform view of test results generated from executing test cases on different platforms of the platforms 170. Also, the reports may be displayed in the user interface 102 that allows drill-downs. For example, test results may be displayed for a functionality, and the test results may include status information of whether test cases for a test scenario are completed and percent completion and whether the test cases passed or failed. The test results may be clicked to get more information about the testing, such as the steps performed by the test cases and screenshots associated with executing the steps. In an example, the test results include snapshots of web pages of the web application 150 that are accessed to execute steps of a test case. These snapshots may be stored in the test data repository and accessed in a drill down of a test report. The test results may be stored in the test data repository 119.

As indicated above, the system 100 may receive status information from the application testing tools 140 that indicates which test cases have been executed and which have yet to be executed and percent completion of test cases that are in progress. The test reporting manager 104 may generate reports that include the status information. The status information may be used to determine when a test case has been completed. This information may be used to determine when to start execution of a second test case that is dependent on results generated from executing a first test case.

The OR generator 103 can identify web objects of the web application 150, and store information about the identified web objects in web object repository 111. The stored information is shown as web objects 114 and may include identification of the web objects and properties of the web objects. For example, the web application 150 may include web objects comprised of elements of one or more web pages of the web application 150. Examples of the web objects may include image objects, buttons, text boxes, tables, paragraphs, etc. The web objects may have properties, such as background and text colors, size of border, height and width of text box, location in web page, etc. Other examples of properties of web objects may include link properties (e.g., source of link, destination of link), image properties, character properties, list properties, etc. The web objects 114, e.g., identifiers and properties, may be used in test scripts of the test cases 117 to identify the web objects and perform operations with the web objects to test functionalities. For example, a text box identifier of the web objects 114 is used to identify and locate a text box on a web page of the web application 150 to enter login information to test login functionality of the web application 150.

In an example, the application OR generator 103 may extract the web objects 114 from web page code of the web application 150. For example, web page code of the web application 150 is parsed to identify known types of web objects, and the code of those web objects, including their properties, is extracted and saved in a specified destination file in the web object repository 111. Different tools and library functions may be available to parse the code and to extract predetermined types of web objects. For example, the OR generator 103 identifies the objects used in the web application 150, and a corresponding library function is invoked to perform a dump of the web objects 114 from the web page code of the web application 150 to a destination file. A name and/or location of the destination file may be received by the system 100. The location of a destination file may include a location identifier, such as an address, link, or another type of reference. In an example, the web page code may include Hyper Text Markup Language (HTML), JAVASCRIPT, PHP, PERL, etc. The invoked library function may identify the web objects 114 from the web page code, extract the web objects 114, and store the web objects 114 in the destination file. The web objects 114 may include object names which may be used in test cases to identify objects in steps in the test cases. The properties of the web objects 114 may include location in the web pages, and other information.

The data storage 110 may include repositories to store data and other information used by the system 100 to test the web application 150. The repositories may include databases, a file storage system, or other types of data storage systems. The data storage 110 may include memory, hard drives and/or other types of data storage hardware. In an example, the system 100 may include software comprised of machine readable instructions stored on a non-transitory computer readable medium which are executable by one or more processors to perform the functions and operations of the system 100 described herein.

FIG. 1 shows examples of repositories that may be stored in the data storage 110. Although shown as separate repositories, the repositories may be combined into one or more repositories or may be provided as separate repositories. Web object repository 111 may store the web objects 114. As discussed above, the web objects 114 may include identifiers and properties of web objects in the web application 150.

Test case repository 112 stores test cases 117 for testing the functionalities of the web application 150. The test cases 117 may be grouped based on the corresponding functionality being tested by each test case. Multiple test cases may be created to test a particular functionality. For example, test cases may be created to test valid and invalid executable procedures of the web application 150. A test case with valid functionality may be referred to as a positive test case and a test case with invalid functionality may be referred to as a negative test case. A test case may include an identifier, a test case name, a test case description, precondition, test steps, expected result, actual result, status, comments, etc. Also, the test cases 117 include associated test scripts. The test scripts are generated in a programming language that can be understood and executed by one of the application testing tools 140 and execute the steps of the test cases 117. In an example, the test scripts may be in one or more programming languages, such as JAVA, C#, GROOVY, PERL, PHP, PYTHON or RUBY, which can be executed by one or more of the application testing tools 140.

The test case repository 112 may also include atomics 115. One or more of the atomics 115 may be used to create the test cases 117. An atomic is reusable program code that is designed to perform a specific operation. Atomics may be designed to perform a very specific task. For example, atomics for browser automation may include an atomic for finding a first matching element (e.g., web object), an atomic for finding all matching elements, an atomic for finding a location of an element, an atomic for getting the size or another property of an element, etc. Atomics may be written for testing application functionalities. For example, the atomics 115 may include atomics for testing a login functionality of the web application 115 or other functionalities. The atomics 115 may include configuration parameters that allow them to be used on the different platforms 170. The configuration parameters may invoke the proper testing tool driver of the testing tool drivers 125 for testing on a particular platform. For example, the configuration parameters may include a browser name and version for testing the web application 150 from a desktop or laptop computer, or a mobile device OS for testing a mobile application of the web application 150, or a mobile device browser name and version for testing the web application 150 from a mobile web browser.

The test case repository 112 may also include workflows 116. The workflows 116 may include atomics or test cases that are sequentially executed. A workflow may specify conditions for executing the atomics or test cases in a particular order. For example, a functionality for entering a contact in the web application 150 may require several operations to be performed in a particular order. A workflow may be created including multiple atomics for testing the several operations for entering a contact. Also, a workflow may be created including multiple cases to test the entering of contact information and/or other operations.

Test data repository 113 stores test data 118 and test results repository 106 stores test results 119. Test data 118 is used for testing the functionalities of the web application 150. For example, the application testing tool 140a may execute operations in a browser to test the web application 150, such as navigating a cursor to a button, clicking on a button, and entering test data. The test data may be a login ID and password if login functionality is being tested. Test data for testing other functionalities may be stored and may be associated with particular ones of the test cases 117. The test results 119 may include test results from testing functionalities of the web application 150. The test data 118 and/or the test results 119 may be stored in a spreadsheet or another type of file in their respective repositories 113 and 106.

The system 100 may invoke the application testing tools 140 to execute the test cases through one or more of the testing tool drivers 125. The testing tool drivers 125 may include application program interfaces for connecting to the web application testing tools 140, providing the test cases 117 (or test scripts for the test cases 117) to the web application testing tools 140, and receiving test results from the application testing tools 140. Each testing tool driver may provide a test case to a particular application testing tool to execute a test case for a particular platform as is discussed below. Examples of testing tool drivers include the Selenium™ web driver for testing through a desktop browser and the Appium™ web driver for testing through a mobile browser or a mobile application.

The application testing tools 140 may receive test cases from the system 100 through the testing tool drivers 125 to execute the test cases 117 for the platforms 170. For example, testing tool driver 125a may facilitate execution of test cases by application testing tool 140a for a desktop web application platform and a mobile web application platform, and testing tool driver 125b may facilitate execution of test cases by application testing tool 140b for a mobile application platform. The application testing tools 140 may include software that can run tests, including test cases, on a software application to test the functionalities of the software application. Examples of the application testing tools 140 are described below.

In an example, the platforms 170 include a desktop browser, such as Firefox™, Chrome™, or Internet Explorer, for accessing the web application 150, a mobile device browser, such as Safari™ or Chrome™ for Android™, for accessing the web application 150, and a mobile application for the web application 150. The application testing tool 140a may execute test cases of the test cases 117 for the desktop browser and the mobile device browser. The application testing tool 140a may emulate user operations via a browser to test different functionalities of the web application 150. Off-the-shelf tools, including open source tools, are available for the application testing tools 140. For example, the application testing tool 140a may include Selenium, which is an open source web application testing tool. Selenium can execute user operations in a browser and perform other operations to test functionalities of the web application 150. For example, a test case for testing login functionality may include operations for accessing the uniform resource locator (URL) of the web application 150, selecting text boxes in the web page for entering a user ID and password, and selecting a login button after entering the user ID and password. The user ID and password may be provided in the test data 118. Selenium may run a test script for the test case to perform these operations, including retrieving the user ID and password, from the test data 118 and entering the information in the selected text boxes via the browser.

A testing tool device 141a may host the application testing tool 140a, such as Selenium or another type of testing tool. The testing tool device 141a may also host and execute browsers 142, which include one or more desktop browsers and one or more mobile device browsers, and the application testing tool 140a may execute test cases via the browsers 142 to execute the test cases for platforms 170 comprising a desktop browser and a mobile device browser. The application testing tool 140a may also or alternatively connect to mobile device 152 and desktop computer 153 to execute test cases. For example, the mobile device 152 may include OS 153 and a mobile web browser 154 that can run on the OS 153, and the application testing tool 140a executes test cases on the web application 150 via the mobile web browser 154.

The mobile device 152 may include a smartphone, tablet or another type of mobile device. Desktop 155 may include a desktop computer, a laptop computer, etc. The desktop 155 (e.g., desktop computer) may include OS 156 and a desktop browser 157 that can run on the OS 156, and the application testing tool 140a executes test cases on the web application 150 via the desktop browser 157.

A testing tool device 141b may host application testing tool 140b. The application testing tool 140b may execute test cases of the test cases 117 for a mobile application 160 of the web application 150. The testing tool device 141b may include a platform emulator 143 that emulates a mobile device platform and that can run the mobile application 160 for running the test cases on the mobile application 160. The application testing tool 140b may also or alternatively connect to mobile device 158 to execute test cases. For example, the mobile device 158 may include OS 159 and mobile application 160, and the application testing tool 140b executes test cases on the mobile application 160. The mobile device 158 may include a smartphone, tablet or another type of mobile device. In an example, the application testing tool 140b may include Appium™, which is an open source testing tool for mobile applications, but it will be apparent to one of ordinary skill in the art that other mobile application testing tools may be used. Appium™ can execute user operations and other operation in a mobile application to test various functionalities. The testing tool device 141a and 141b are computers. The computers may include servers, personal computers or other types of computers.

In an example, the testing tool and the software testing system 100 may be hosted on the same device, which may include a server, a personal computer or another type of computer. For example, the application testing tool 140a, the browsers 142, and the software testing system 100 may be hosted on the testing tool device 141a. The testing tool device 141a may host multiple application testing tools, such as the application testing tool 140a and the application testing tool 140b. The repositories 111, 112, 113, and 106 may be stored locally and/or may be stored remotely in a central location in a shared repository. In another example, the application testing tool 140a and/or the application testing tool 140b may be hosted on a testing device remote from the software testing system 100, and test cases are executed on the remote testing device.

Application server 151 hosts web application 150 which is the application being tested. A server as used herein, for example, includes hardware, such as one or more processors, and data storage, including a non-transitory computer readable medium, that can store machine readable instructions executed by the one or more processors. The server may include other hardware as is known in the art. A server may have one or more dedicated operations. For example, the application server 151 hosts the web application server 150 and provides other computers with access to the web application server 150 via the Internet.

One or more users 109 may connect to the system 100 to perform different operations. For example, testers may connect to the system 100 to execute test cases and generate reports of test results. Also, developers may connect to the system to create test cases and create test data. Also, the system 100 may store test cases for testing multiple applications. A set of test cases, web objects, test data, test results, etc., may be stored for each application being tested through the system 100.

A journey may include functionalities of an application, such as web application 150, to be tested, and platforms for testing the functionalities. For each functionality, one or more test cases may be stored in the test case repository 112 to test the functionality. The system 100 facilitates execution of the test cases for the functionalities of the journey on the platforms specified for the journey.

Figure 2A:
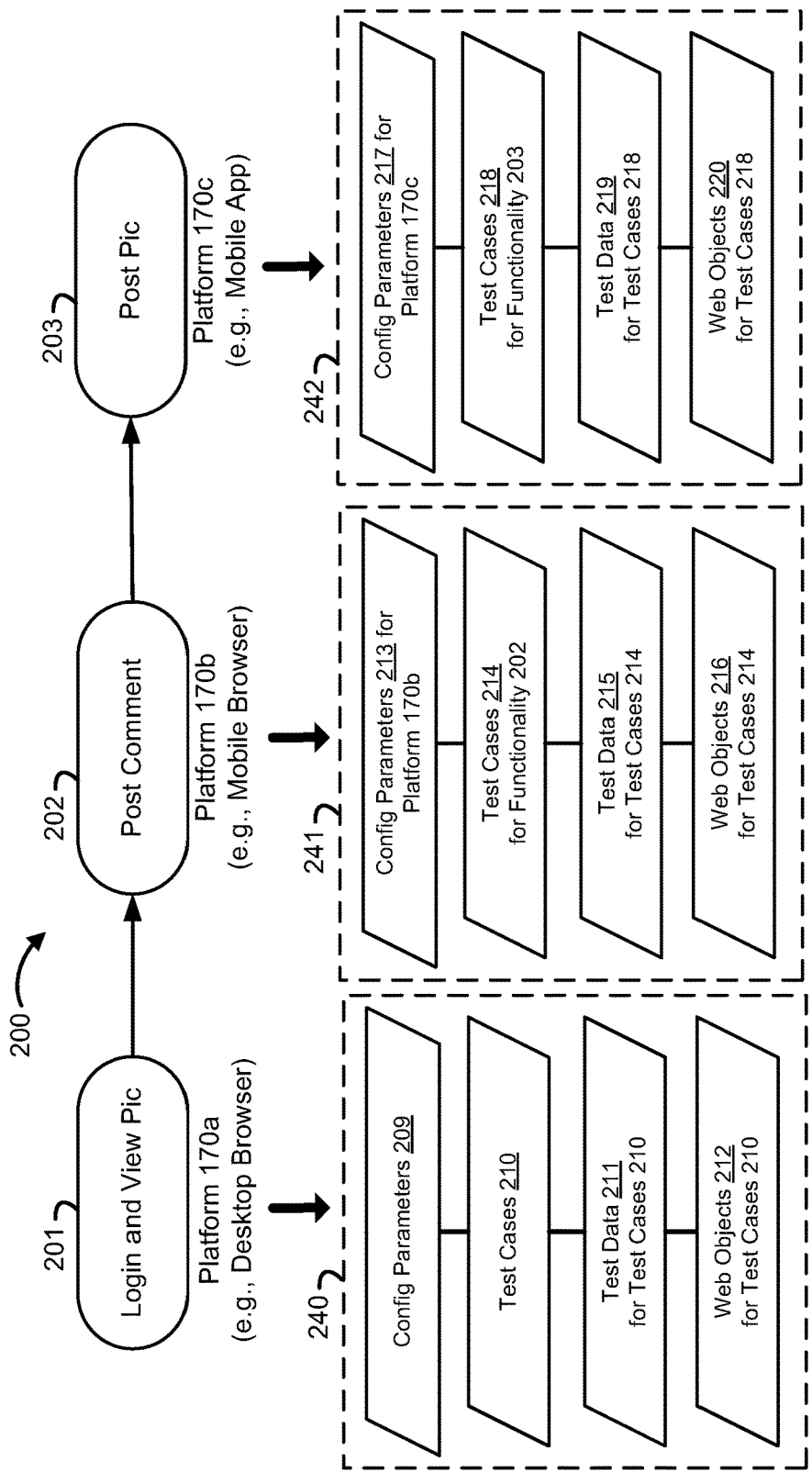
FIG. 2A illustrates a journey, according to an example of the present disclosure.

FIG. 2A shows an example of a journey 200. The journey includes functionalities 201-203 and indicates platforms for testing the functionalities 201-203. In an example, a user may select the journey for testing through the user interface 102. For example, a journey may be created and provided as a selectable option in the user interface 102, or the user may create the journey in the user interface 102 by selecting functionalities and at least one platform for testing each functionality.

The journey 200 may be associated with testing common or possible interactions of a user with the web application 150 over multiple platforms over a period of time. Accordingly, the system 100 may provide a unified framework for testing the common usage of an application across different platforms. For example, assume web application 150 is a social media application that enables users to share content, including posting and viewing comments and pictures. The functionalities 201-203 include functionalities of the social media application. The functionalities 201-203 are associated with a user performing different actions on the social media application through different platforms. For example, functionality 201 includes logging into the social media application and viewing a picture posted by another user. The scenario being tested may include a user receiving an email from the social media application indicating that the other user has posted a picture, and the user clicks on a link to log into the social media application through a web browser and view the picture. For example, the user may open the email with the link on a laptop computer while at work and click on the link to access the social media application through the desktop browser. The platform for the functionality 201 may be platform 170a comprised of a desktop browser. The platform may be specified by indicating the type of desktop browser, the OS, and other platform parameters if needed.

The functionality 202 may include posting a comment about the picture. The platform for the functionality 202 may include the platform 170b, such as a mobile browser. For example, while at lunch, the user of the social media application may access the social media application through their office mobile device via a browser on the mobile device, and view comments about the picture and post a comment about the picture. This scenario is tested by the functionality 202 on the platform 170b.

The functionality 203 may include posting a picture. The platform for the functionality 203 may include the platform 170c, such as a mobile application for the social media application. For example, while at home, the user of the social media application may execute the mobile application to post a picture.

To test the functionalities 201-203 on their associated platforms 170a-c, the testing controller 105 may generate test packages 240-242 for the functionalities 201-203. A test package for a functionality may include one or more test cases, test data for the test cases, and web objects (e.g., identifier for the web objects and properties) for the test cases. The test package may also include configuration parameters for the associated platform. The configuration parameters may be incorporated in the test cases.

Figure 2B:
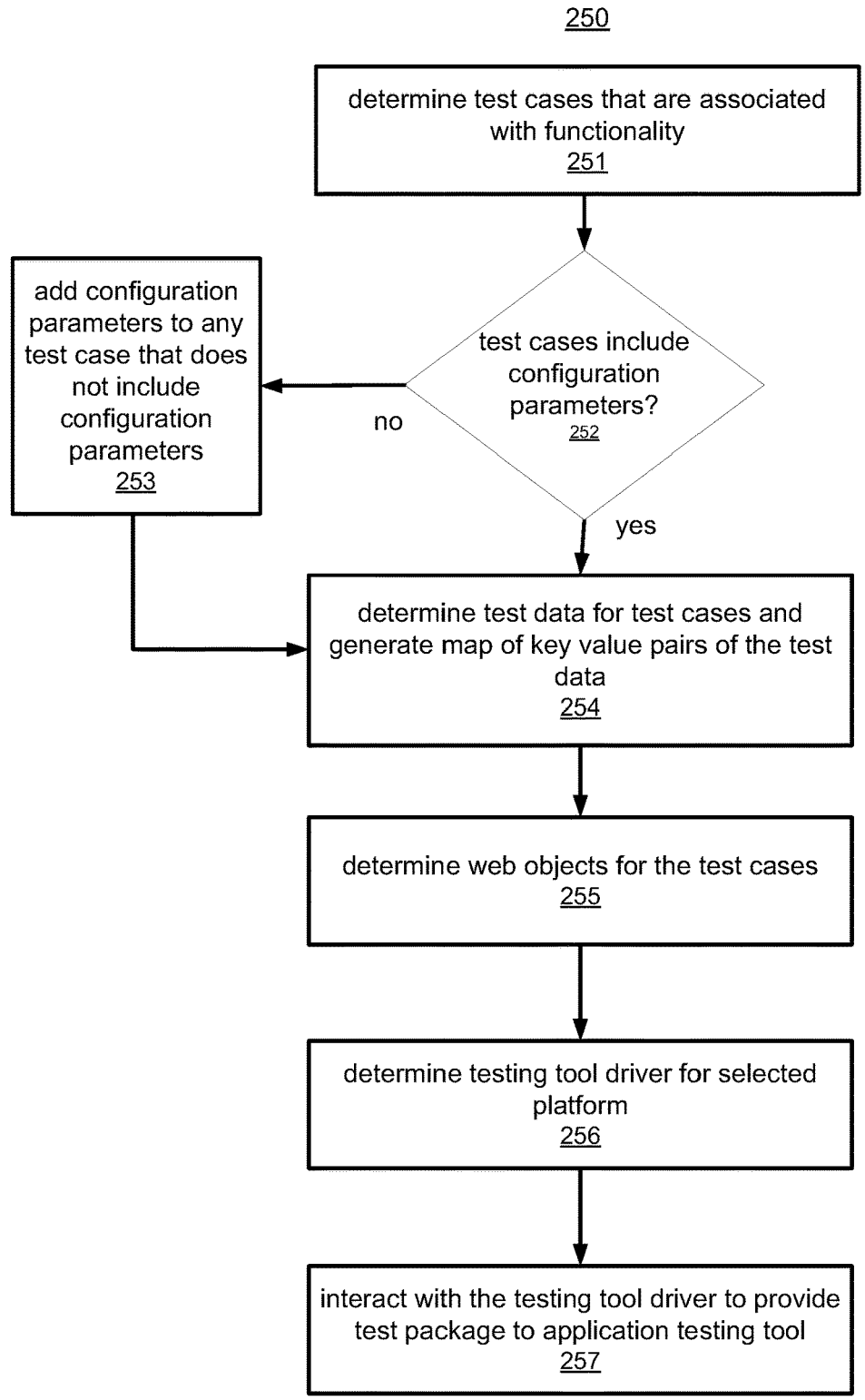
FIGS. 2B-C illustrate computer-implemented methods associated with the journey shown in FIG. 2A, according to examples of the present disclosure.

FIG. 2A also shows examples of test packages 240-242 for the functionalities 201-203, respectively. FIG. 2B shows a method 250 for creating a test package. The steps of the method 250 are described by way of example with respect to the journey 200 and one or more of the test packages 240-242, and the system 100 may perform the method 250. Test package 240 shown in FIG. 2A is for testing the functionality 201 on the platform 170a. The test package 240 includes test cases 210 from the test case repository 112 that are associated with the functionality 201. At 251 of the method 250, the testing controller 105 determines the test cases 210 that are associated with the functionality 201 based on stored relationships between functionalities and test cases. For example, the functionality 201 may be created in the system 100, and when it is created, test cases 210 are associated with the functionality 201. The functionality 201 may be stored as a test scenario in the data storage 110, and the test cases 210 associated with the test scenario are also stored. The test cases 210 may include an identifier of the test scenario, so the testing controller 105 can retrieve the test cases 210 associated with the same test scenario from the test repository 112 using the identifier of the test scenario.

At 252 shown in FIG. 2B, the testing controller 105 determines whether the test cases 210 include configuration parameters 209 for the platform 170a. For example, the testing controller 105 may determine whether the test cases 210 include configuration parameters 209 for one or more desktop browsers. If the test cases 210 do not include the configuration parameters 209, the configuration parameters 209 may be added to the test cases 210 at 253. The configuration parameters 209 may be used by the testing tool driver 125a to facilitate execution of the test cases 210 on the platform 170a by the application testing tool 140a. The configuration parameters 209 are included in the test cases 210 and are shown in FIG. 2A as part of the test package 240.

Test data 211 may also be determined for the test cases 210. The test data 211 may include a map of key value pairs determined from test data in the test data repository 113. In an example, test data for the test cases 210 and possibly other test cases may be stored in the test data repository 113 in a spreadsheet file. The test data may be initially provided with the test cases, such as by a developer or retrieved from a remote device and stored in the system 100. At 254 shown in FIG. 2B, test data 211 for the test cases 210 is determined by the testing controller 105, and a map of key value pairs of the test data 210 is generated. For example, the testing controller 105 may execute a script to extract the test data for the test cases 210, and generate a map of key value pairs of the test data 210. The key represents an identifier of an item of test data, and the value represents an actual value of the test data. For example, the test data 211 may include a login ID and password. The keys for these items may be unique identifiers for the login ID and password. The values may be the actual login ID, such as a name or email address of the user, and an actual password of the user. The map of key value pairs may be a JAVA map. The test data 210 is shown in FIG. 2A as part of the test package 240.

At 255 shown in FIG. 2B, the testing controller 105 determines web objects 212 for the test cases 210. For example, the test cases 210 may include test scripts identifying particular web objects from the web object repository 111. Web objects 212 may include identifiers and properties of the web objects used by the test cases 210. The web objects 212 may be used by the application testing tool 140a to execute steps in the test cases 210. The web objects 212 are shown in FIG. 2A as part of the test package 240.

At 256 shown in FIG. 2B, the testing controller 105 determines the testing tool driver associated with the selected platform 170a for testing the functionality 201. In this example, the associated testing tool driver for the functionality 201 is the testing tool driver 125a. At 257 shown in FIG. 2B, the testing controller 105 interacts with the testing tool driver 125a, such as through a function call or another mechanism, to provide the test package 240 to the application testing tool 140a. The application testing tool 140a executes the test cases 210 on the platform 170a and send test results to the system 100 via the testing tool driver 125a.

The method 250 may be repeated to create test packages 241 and 242 shown in FIG. 2A. For example, the method 250 is performed for determining test packages and testing tool drivers and providing the test packages to the associated application testing tool is also performed for the functionalities 202 and 203. For example, for the functionality 202, the test package 241 is generated. The test package 241 may include configuration parameters 213, test cases 214, test data 215 and web objects 216. The testing tool driver for the platform 170b, e.g., mobile browser, is the testing tool driver 125a. For example, the testing tool driver 125a may be used for both the desktop browser and the mobile browser platforms. In other examples, different drivers are used for these platforms. The testing controller 105 may interact with the testing tool driver 125a to provide the test package 241 to the application testing tool 140a, which may also execute test cases on a mobile browser in addition to a desktop browser.

For the functionality 203, the test package 242 is generated. The test package 242 may include configuration parameters 217, test cases 218, test data 219 and web objects 220. The testing tool driver for the platform 170c, e.g., mobile application, is the testing tool driver 125b. The testing controller 105 may interact with the testing tool driver 125b to provide the test package 242 to the application testing tool 140b, which executes the test cases 219 on the mobile application.

Figure 2C:
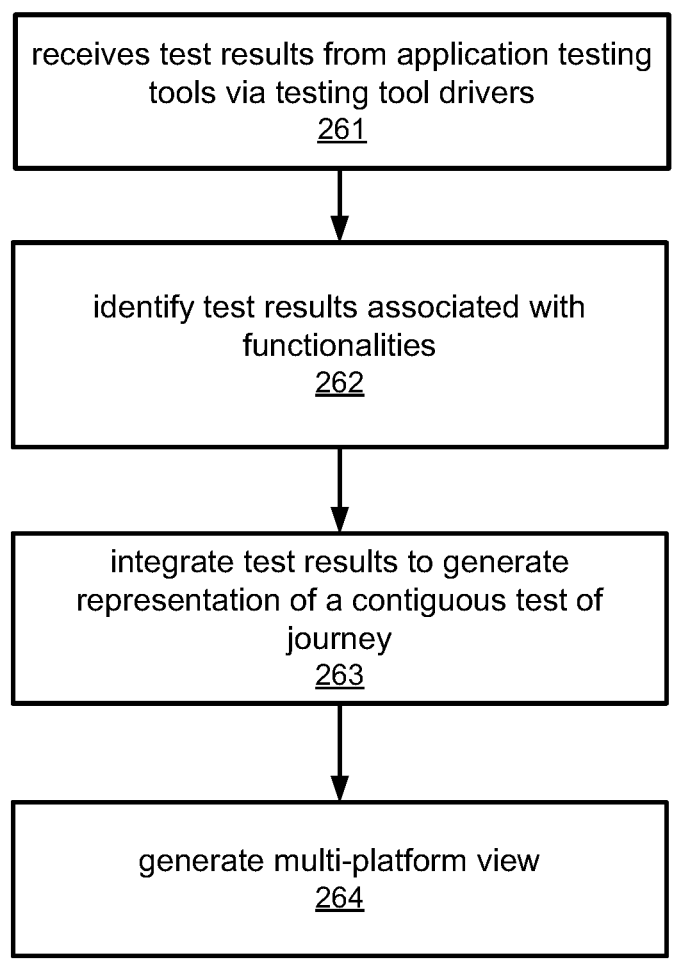

FIG. 2C shows a method 260 for integrating test results for a journey. The steps of the method 260 are described by way of example with respect to the journey 200, and the system 100 may perform the method 250. At 261, the system 100 receives test results from executing the test cases 210, 214 and 218 from the application testing tools 140a-b via the testing tool drivers 125a-b. At 262, the system 100 identifies the test results associated with the functionalities 201-203. For example, the test results for each test case may be stored with an identifier of the test case. The identifier may further be associated with a test scenario or test suite that is also associated with a particular functionality. Accordingly, the functionality for each test case and the test results for each test case may be determined and used to correlate test results with a particular functionality.

Figure 7:
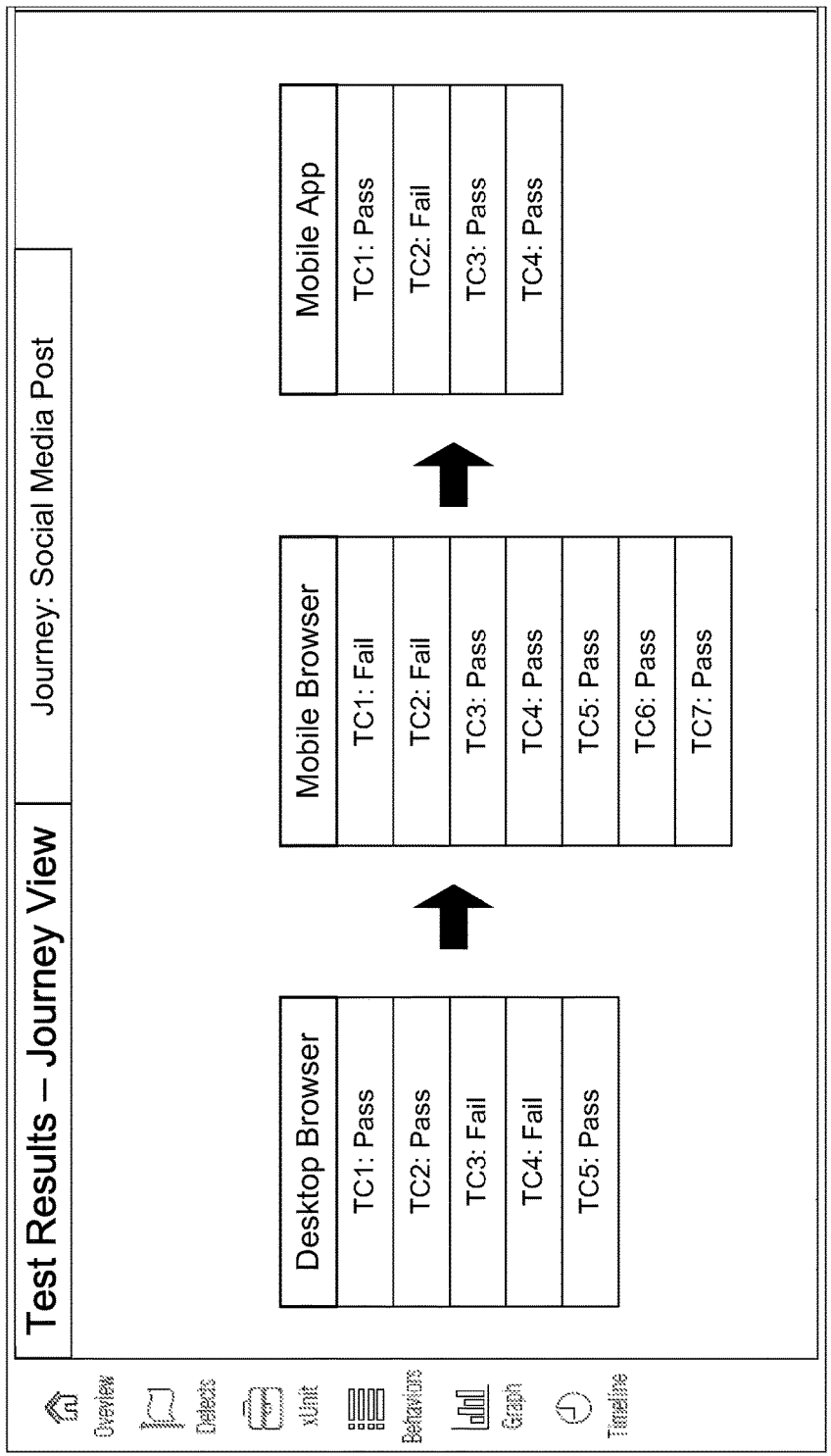

At 263, the test results are integrated to generate a representation of a contiguous test of the journey 200, and at 264, a multi-platform view is generated in the user interface 102 that represents a contiguous test of the journey 200 across the platforms 170a-c. For example, the test results from test cases for the functionalities 201-203 are compiled and may be represented in a temporal fashion and indicate the platform for each test case. For example, the functionalities 201-203 of the journey 200 are shown and are sequentially displayed according to the order the functionalities 201-203 would be performed by a user. The platforms for each of the functionalities 201-203 are shown and the test results for each of the functionalities 201-203 are shown and associated with the displayed functionalities 201-203. The test results may include pass/fails and other test metrics. The user interface 102 can provide drill-downs showing additional details for each test case or web page being tested, for example, in response to a user clicking on test results. The test reporting manager 104 may include the consolidated view generator 230 that can generate the multiplatform view of the test results received from the application testing tools 140a-b. The multiplatform view may show test results of all the functionalities 201-203 on a single screen. The multiplatform view may include test results across multiple different platforms and may include test results generated by different application testing tools. The multiplatform view may be generated in the user interface 102 and may allow for drill downs to display additional details on the test results. The test results may include indication of passed and failed test cases and the drill downs may allow a user to view additional details on steps that failed and snapshots of web pages associated with the failed steps. An example of a multi-platform form is shown in FIG. 7 which is described below.

The test results may also include status information. The status information may indicate which test cases have been executed and which have yet to be executed and percent completion of test cases that are in progress. The status information may be used to determine when a test case has been completed.

Status information may also indicate when atomics for a test case are completed, and this information may be used to determine when to start execution of a second atomic that is dependent on results generated from executing a first atomic in a test case. For example, a first atomic in a test case may calculate a value, and a second atomic in the test case may use the value to perform an operation. The second atomic may be executed on a different platform by a different application testing tool. The system 100 determines when the first test atomic is completed based on received status information and received test data including the calculated value. The system 100 can then invoke testing of the second atomic on the second platform using the calculated value. Accordingly, the system 100 may facilitate an ordered execution of dependent atomics across multiple platforms based on received status information.

Execution of test cases 210, 214, 218 for the functionalities 201-203 may be performed in parallel or sequentially. If certain test cases are dependent on one another, then those test cases are executed sequentially. Other test cases may be executed in parallel or sequentially. A user may specify whether test cases are executed in parallel or sequentially. Also, computer resources may be evaluated to determine whether there is sufficient capacity to execute test cases in parallel.

Figure 3:
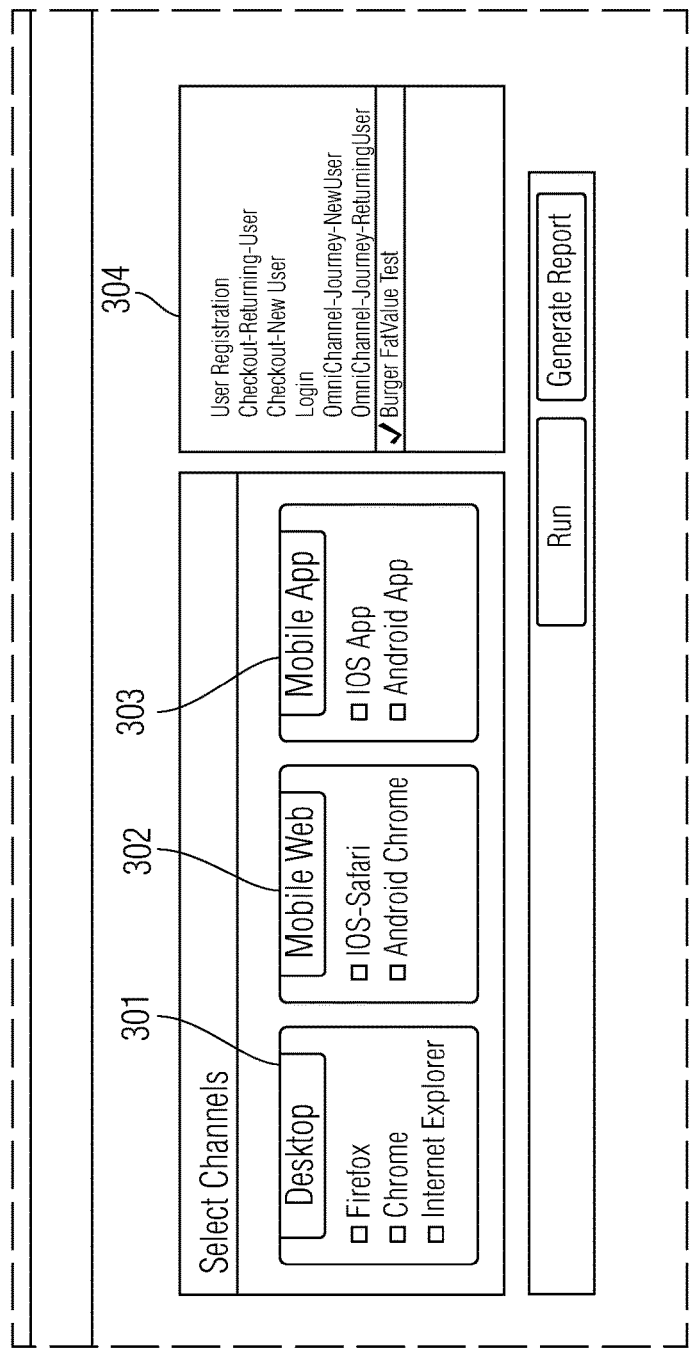

FIGS. 3-7 show examples of screen shots that may be generated in the user interface 102 by the system 100. FIG. 3 shows an example of screenshot for selecting platforms and functionalities to test. A user interface 300, such as a graphical user interface (GUI) can include windows for identifying browser types for use in performing ominchannel testing. For example, a desktop window 301 can display information about available desktop browsers, such as Firefox™, Chrome™, and Internet Explorer™. For example, for a desktop browser platform, different types of browsers may be selected at 301. Also, for a mobile browser platform, different types of mobile browsers may be selected at 302. For a mobile application platform, different types of OS's may be selected at 303. Also, at 304, functionalities to be tested may be selected. A journey may also be selected, which may include a predetermined set of functionalities and platforms for testing. Once one or more platforms and one or more functionalities are selected, the user may click the Run button to automatically execute the tests on the different platforms. Accordingly, a simplified, easy-to-use interface is provided for multiplatform test execution. The system 100 automatically determines the test cases and other information, such as one or more test packages, and facilitates execution of the test cases on the selected platform, such as described above. The user may click on the Generate Report button to generate reports for the executed tests.

Figure 4:
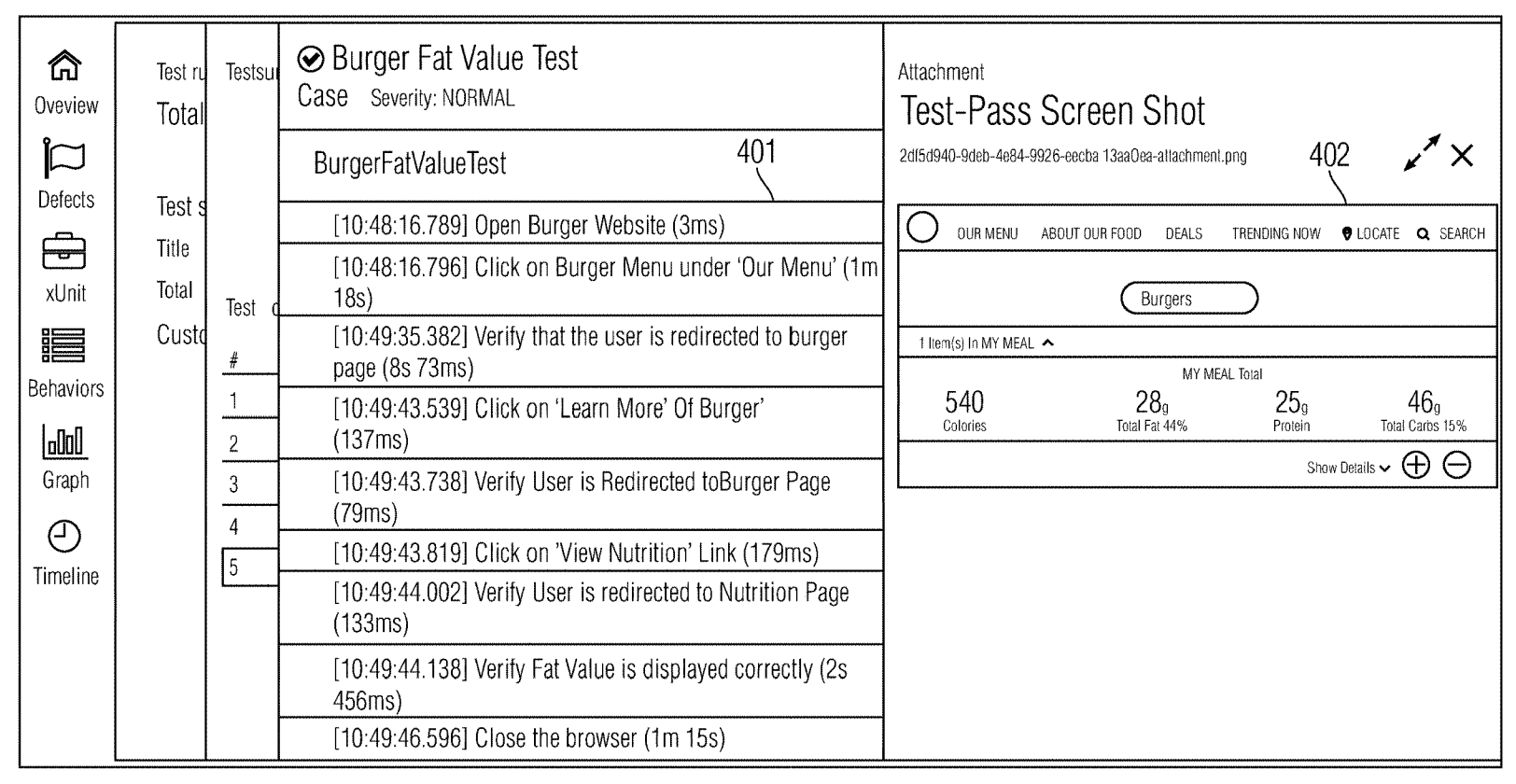
Figure 5:
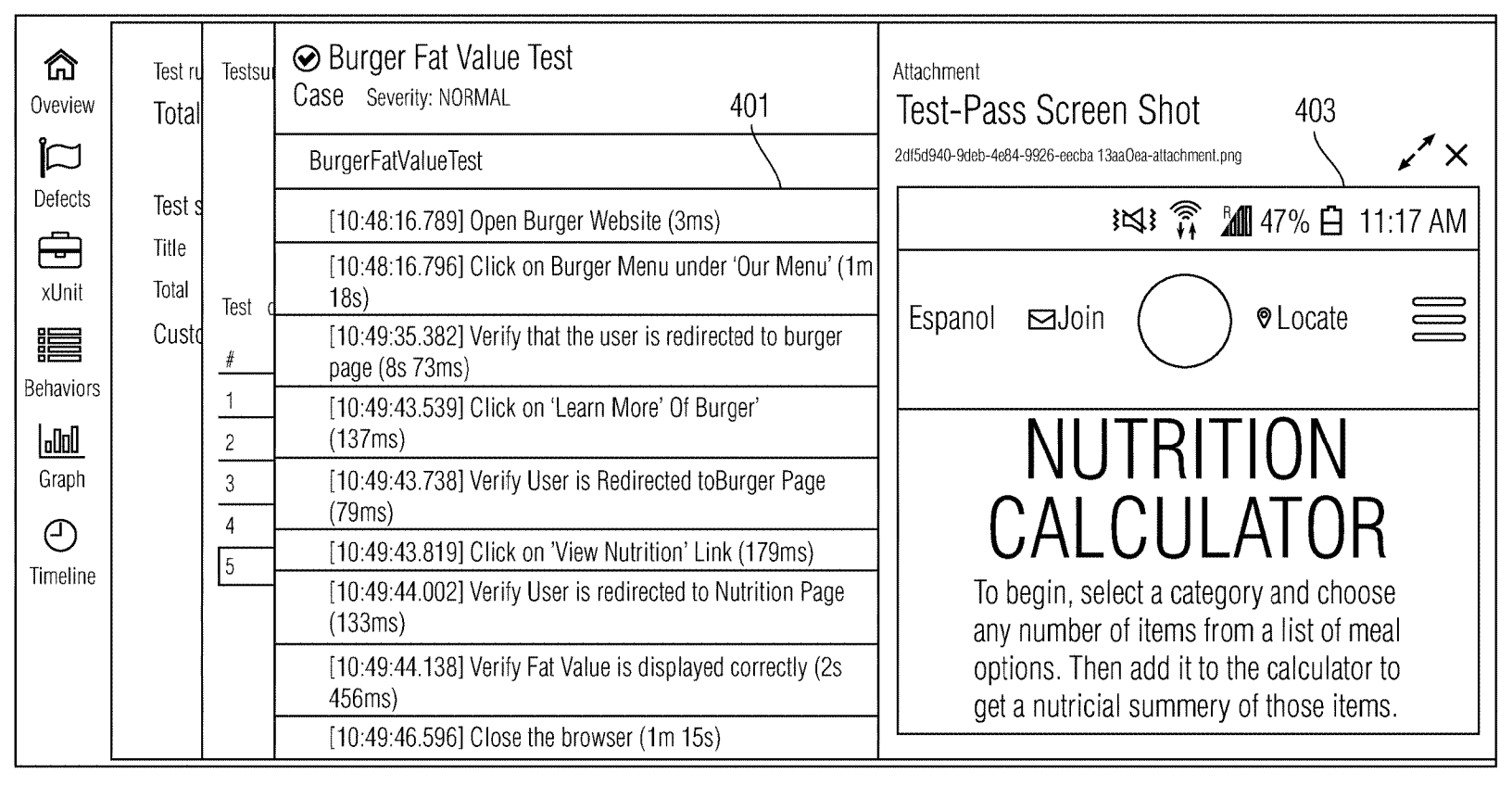
Figure 6:
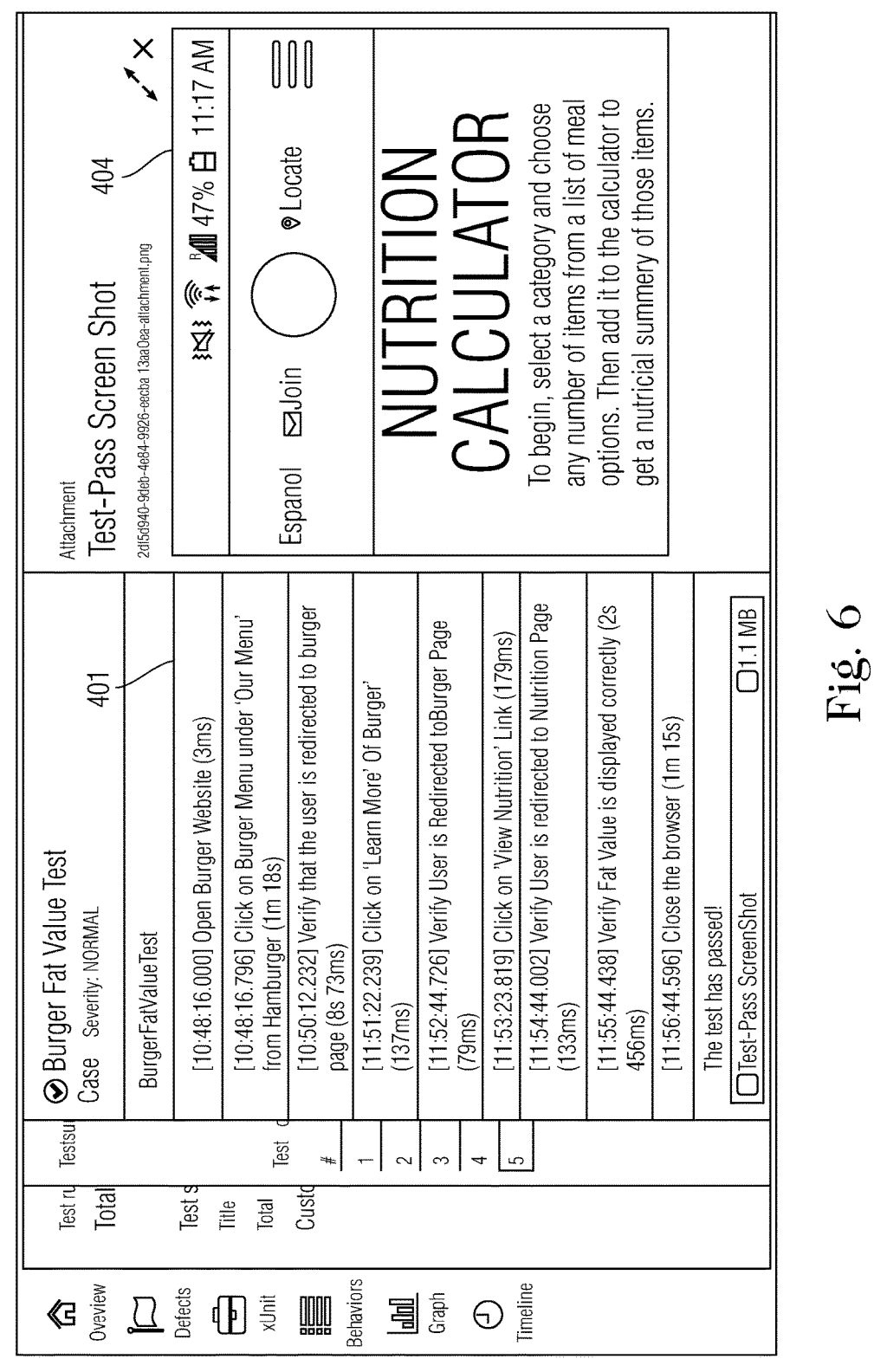

FIGS. 4-6 show examples of test reports. As indicated above, the test reports may allow for drill downs that show the test steps executed for the test cases and show screen snapshots of web pages accessed for the test steps. Steps 401 for an executed test case are shown in FIGS. 4-6. The executed test case is determined based on the user selection at 304 in FIG. 3. In FIGS. 4-6, screen snapshots 402-404 of web pages are shown for different steps. Other reports may be generated by the system 100. For example, a multiplatform view may be generated that include the test results of test cases executed across different platforms.

FIG. 7 shows an example of a multi-platform view of test results, which is also discussed above with respect to step 263 in FIG. 2C. In FIG. 7, the multiplatform view is shown as a journey view, which includes test results of a journet, such as journey 200 discussed above. When the journey 200 is created, the user may name the journey 200, such as "Social Media Post". The journey name is shown in FIG. 7. Also, the journey view identifies the platforms in the journey 200, such as desktop browser, mobile browser, and mobile app. Test cases are executed to test the functionalities 201-203 of the journey 200 on their respective platforms, and the test results are shown for each platform. For example, in FIG. 7, test cases 1-5 (TC1-TC5) are shown for the desktop browser, TC1-TC7 are shown for the mobile browser, and TC1-TC4 are shown for the mobile app. Also, test results are shown, such as pass or fail, for each test case. A user may click on a test case to drill down to details regarding each test case. Details may include steps executed by a test case, web pages accessed for the test steps (such as shown in FIGS. 4-6), and an indication any failed steps. Also, the arrows in FIG. 7 indicate the temporal execution of functionalities being tested on different platforms, which is also shown in FIG. 2A. The test cases for each platform, however, may be executed simultaneously to minimize testing time.

Figure 8:
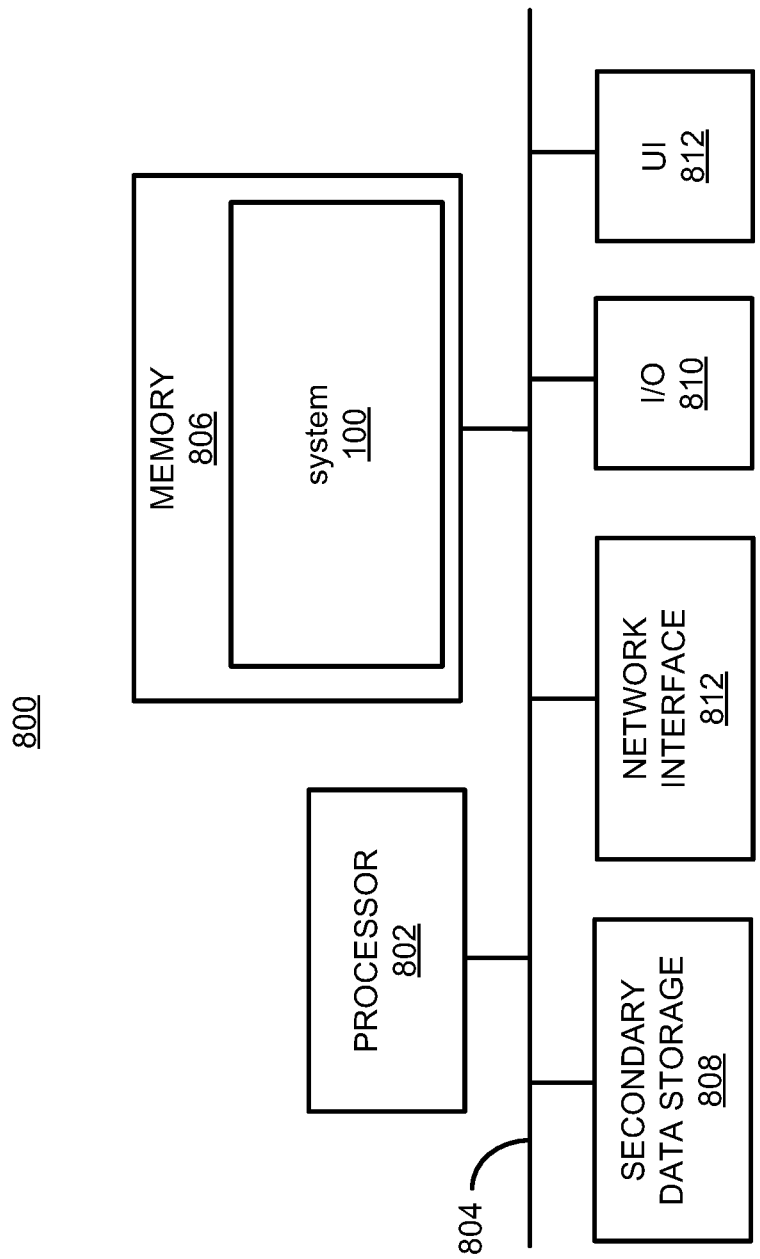
FIG. 8 illustrates a hardware platform, according to an example of the present disclosure.

FIG. 8 shows a computer system 800 that may be used with the examples described herein. The computer system may represent a computational platform that includes components that may be in a server or another computer system. The computer system 800 may be used as part of a platform for testing tool devices 141a and 141b and may be used as a platform for a host of the system 100. The computer system 800 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 800 may include a processor 802 that may implement or execute machine readable instructions performing some or all of the methods, functions and other processes described herein. Commands and data from the processor 802 may be communicated over a communication bus 804. The computer system may also include a main memory 806, such as a random access memory (RAM), where the machine readable instructions and data for the processor 802 may reside during runtime, and a secondary data storage 808, which may be non-volatile and stores machine readable instructions and data. The memory and data storage are examples of computer readable mediums. The memory 806 may include machine readable instructions residing in the memory 806 during runtime and executed by the processor 802. The memory 806 and/or the secondary data storage may store data used by the system 100, such as the object repository including web objects 213, configuration data, test data, etc.

The computer system 800 may include an Input/Output (I/O) device 810, such as a keyboard, a mouse, a display, etc. A user interface (UI) 812 can be a display device that provides textual and graphical user interfaces to a user of the system 100. The UI 812 may operate with I/O device 810 to accept from and provide data to a user. The computer system may include a network interface 812 for connecting to a network. Other known electronic components may be added or substituted in the computer system. The processor 802 may be designated as a hardware processor. The processor 802 may execute various components of the system 100 described above and perform the methods described below.

Figure 9:
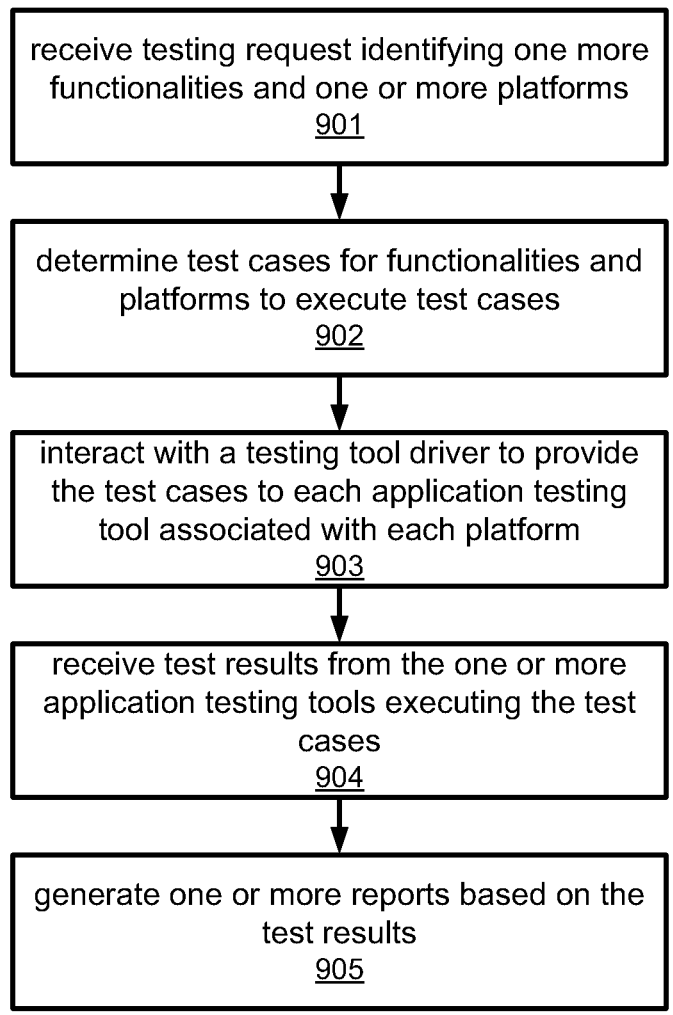
FIG. 9 illustrates a computer-implemented method, according to an example of the present disclosure.

FIG. 9 illustrates a flowchart of a computer-implemented method 900 for multi-platform testing of an application, which may include a web application. The method 900 may be implemented by the system 100 described above, or by other systems.

At 901, a testing request is received at the system 100 to test a web application, such as the web application 150. The testing request may identify one or more functionalities of the web application to test, and may identify one or more platforms for testing each functionality. For example, the system 100 receives a selection via the user interface 102 of one or more platforms for testing and one or more functionalities to test. In another example, the system 100 may receive a request from another computer, such as over a network, which identifies one or more functionalities of the web application to test, and may identify one or more platforms for testing each functionality.

At 902, the system 100 determines, based on the testing request, test cases for functionalities and platforms to execute the test cases. For example, as discussed with respect to FIG. 2, test cases may be determined for each functionality to be tested. Also, the testing request may designate a platform for testing each functionality, and the test cases for each functionality may be executed on the designated platform. Also, a test package, including the test cases, may be determined for each functionality to be tested. In an example, functionalities that may be selected for testing have pre-assigned test cases that may be retrieved from the test case repository 112. One or more test cases may be retrieved for each functionality to be tested.

At 903, the system 100 interacts with a testing tool driver to provide the test cases to each application testing tool associated with each platform. For example, referring to FIG. 2, test cases 210 are provided to application testing tool 140a through interactions with the testing tool driver 125a for testing on the platform 170a, and test cases 219 are provided to application testing tool 140b through interactions with the testing tool driver 125b for testing on the platform 170c.

At 904, the system 100 receives test results from the one or more application testing tools executing the test cases. For example, referring to FIG. 2, the system 100 receives test results from the application testing tool 140a through the testing tool driver 125a, and the system 100 receives test results from the application testing tool 140b through the testing tool driver 125b.

At 905, the system 100 generates one or more reports based on the test results. The reports may include a multi-platform view of the test results executed on different platforms. In an example, the reports are generated in the user interface 102. The reports may include multi-platform views. For example, test results for test cases executed on different platforms are integrated into a multi-platform view that represents a contiguous test of a journey across multiple platforms.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A software testing system comprising:
 a web object repository to store web page objects of a web application and properties of the web page objects;
 a test case repository to store test cases for testing the web application;
 a test data repository to store test data for the test cases;
 a testing device comprising a processor, connected to a memory, to execute machine readable instructions to:
  receive a testing request to test the web application, wherein the testing request identifies
   functionalities of the web application to test, and
   platforms of different platform types on which the functionalities will be tested;
  determine a first test package for testing a first functionality of the functionalities, the first test package for testing the first functionality on a first platform of the platforms, the determining comprising
   selecting a first plurality of test cases from the test case repository for testing the first functionality,
   creating, for the first plurality of test cases, a first map of key-value pairs for test data from the test data repository, and
   identifying a first plurality of web objects from the web object repository that are for the first plurality of test cases;
  determine a first driver for executing the first plurality of test cases on the first platform, wherein the first driver interacts with a first web application testing tool;
  interact with the first driver to transmit the first test package to the first web application testing tool to execute the first plurality of test cases on the first platform, wherein the first test package includes the first plurality of test cases, the first map, and information for identifying the first plurality of web objects in the web application;
  receive, via the first driver, first test results and first status information from the first web application testing tool executing the first plurality of test cases on the first platform;
  determine a second test package for testing a second functionality of the functionalities in the testing request on a second platform of the platforms, the second platform being of a platform type that differs from the platform type of the first platform, the determining of the second test package for testing the second functionality comprising
   selecting, using the first test results and first status information from the first web application testing tool, a second plurality of test cases from the test case repository for testing the second functionality on the second platform,
   creating, for the second plurality of test cases, a second map of key-value pairs for test data from the test data repository, and
   identifying a second plurality of web objects from the web object repository that are for the second plurality of test cases;
  determine a second driver for executing the second plurality of test cases on the second platform, wherein the second driver interacts with a second web application testing tool;
  interact with the second driver to transmit the second test package to the second web application testing tool to execute the second plurality of test cases on the second platform, wherein the second test package includes
   the second plurality of test cases,
   the second map of key-value pairs, and
   information for identifying the second plurality of web objects in the web application;
  receive, via the second driver, second test results from the second web application testing tool executing the second plurality of test cases; and
  generate a multiplatform view of the first and second test results.

2. The software testing system of claim 1, wherein the testing device is to:
 determine whether a test case of the first plurality of test cases includes configuration parameters for the first platform; and
 instantiate the configuration parameters in the test case when the test case does not include the configuration parameters.

3. The software testing system of claim 2, wherein the configuration parameters include at least one of browser name, browser version, and an operating system identifier.

4. The software testing system of claim 1, wherein the testing device is to:
 determine from the testing request that the first plurality of test cases is to be executed in parallel with the second plurality of test cases; and
 interact with the first and second drivers to have the first and second plurality of test cases executed simultaneously by the first and second web application testing tools.

5. The software testing system of claim 1, wherein the testing device is to:
 determine from the testing request that the first plurality of test cases is to be executed sequentially with the second plurality of test cases; and
 interact with the first and second drivers to have the first and second plurality of test cases executed sequentially by the first and second web application testing tools.

6. The software testing system of claim 1, wherein to receive the testing request, the testing device is to:
 generate a user interface, the user interface to:
  display information about functionalities of the web application to be tested, and
  display the platforms of different platform types for testing the functionalities;

receive, via the user interface, selected functionalities from the displayed information about functionalities, wherein the selected functionalities are identified as the functionalities of the web application to test; and receive, via the user interface, selected platforms from the displayed platforms, wherein the selected platforms are identified as the platforms for testing the selected functionalities.

7. The software testing system of claim 1, wherein to receive the testing request, the testing device is to:

generate a user interface displaying a journey for testing the web application, wherein the journey includes the functionalities of the web application and the platforms of different platform types for testing the functionalities of the web application;

receive a selection of the journey; and determine from the selection of the journey, the identified functionalities of the web application to test and the identified platforms of different platform types for testing the functionalities.

8. The software testing system of claim 1, wherein the platforms of different platform types comprise a desktop web browser, a mobile web browser and a mobile application.

9. The software testing system of claim 1, wherein the testing device is to:

parse web pages of the web application to identify the web page objects and the properties of the web page objects; and store an identifier of the web page objects and the properties of the web page objects in the web object repository.

10. A software testing system to test a web application across multiple platforms, the software testing system comprising:

a memory to store machine readable instructions; and a processor, connected to the memory, to execute the machine readable instructions to:

receive, via a user interface, a selection of a journey for testing the web application, wherein the journey is associated with testing functionalities of the web application across different platforms of different platform types;

determine, based on the selected journey, a first test package for testing a first functionality of the web application on a first platform of the different platforms;

interact with a first driver to transmit the first test package to a first web application testing tool to execute a first plurality of test cases associated with the first functionality on the first platform;

receive, via the first driver, first test results and first status information from the first web application testing tool executing the first plurality of test cases on the first platform;

determine, based on the selected journey, the first test results, and the first status information, a second test package for testing a second functionality of the web application on a second platform, the second platform being of a platform type that differs from the platform type of the first platform;

interact with a second driver to transmit the second test package to a second web application testing tool to execute a second plurality of test cases associated with the second functionality on the second platform;

receive, via the second driver, second test results from the second web application testing tool executing the second plurality of test cases;

integrate the first test results and the second test results to generate a representation of a contiguous test of the journey; and generate a multiplatform view of the representation of the contiguous test of the journey from the integrated first and second test results.

11. The software testing system of claim 10, wherein the processor is to:

determine whether a test case of the first plurality of test cases includes configuration parameters for the first platform; and in response to determining the test case does not include the configuration parameters, instantiate the configuration parameters in the test case.

12. The software testing system of claim 11, wherein the configuration parameters include browser name, browser version and operating system.

13. The software testing system of claim 10, wherein the processor is to:

determine that the first plurality of test cases is to be executed in parallel with the second plurality of test cases; and interact with the first and second drivers to have the first and second plurality of test cases executed simultaneously by the first and second web application testing tools.

14. The software testing system of claim 10, wherein the processor is to:

determine that the first plurality of test cases is to be executed sequentially with the second plurality of test cases; and interact with the first and second drivers to have the first and second plurality of test cases executed sequentially by the first and second web application testing tools.

15. The software testing system of claim 10, wherein the different platforms of different platform types comprise a desktop web browser, a mobile web browser and a mobile application for the web application.

16. A computer-implemented method executed by at least one processor, the method comprising:

receiving a testing request to test a web application, wherein the testing request identifies:

functionalities of the web application to test; and platforms of different platform types for testing the functionalities;

determining, based on the testing request, a first plurality of test cases from a test case repository for testing a first functionality of the web application on a first platform of the platforms;

interacting with a first driver to transmit the first plurality of test cases to a first web application testing tool to execute the first plurality of test cases on the first platform;

receiving, via the first driver, first test results and first status information from the first web application testing tool executing the first plurality of test cases on the first platform;

determining, based on the testing request, the first test results, and the first status information, a second plurality of test cases from the test case repository for testing a second functionality of the web application on a second platform of the platforms, the second platform different from the first platform and is of a platform type different than the platform type of the first platform;

interacting with a second driver to transmit the second plurality of test cases to a second web application testing tool to execute the second plurality of test cases on the second platform;

receiving, via the second driver, second test results from the second web application testing tool executing the second plurality of test cases;

integrating the first test results and the second test results to generate a representation of a contiguous test; and generating a multiplatform view of the representation of the contiguous test in the user interface.

17. The computer-implemented method of claim 16, comprising:

determining whether a test case of the first plurality of test cases includes configuration parameters for the first platform; and in response to determining the test case does not include the configuration parameters, instantiating the configuration parameters in the test case.

18. The computer-implemented method of claim 16, wherein the platforms comprise a desktop web browser, a mobile web browser and a mobile application for the web application.

* * * * *